Sept. 14, 1943.  A. FLUKES  2,329,192
REFRIGERATING APPARATUS
Filed March 11, 1939   2 Sheets-Sheet 1

Inventor.
Andrew Flukes.
By: Carl S. Lloyd
Atty.

Sept. 14, 1943.　　　　　A. FLUKES　　　　　2,329,192
REFRIGERATING APPARATUS
Filed March 11, 1939　　　2 Sheets-Sheet 2

Inventor.
Andrew Flukes.
By: Carl S. Lloyd
Atty.

Patented Sept. 14, 1943

2,329,192

UNITED STATES PATENT OFFICE 2,329,192

REFRIGERATING APPARATUS

Andrew Flukes, Chicago, Ill., assignor to Mills Novelty Company, Chicago, Ill., a corporation of Illinois Application March 11, 1939, Serial No. 261,172

12 Claims. (Cl. 62—5)

This invention relates to absorption type refrigeration apparatus of the general nature disclosed in my pending applications Serial Nos. 6,899 and 170,571, filed, respectively, on February 16, 1935, and October 23, 1937, which have become Patents Nos. 2,150,369 and 2,237,302.

Such apparatus includes a generator, a condenser, an evaporator and an absorber interconnected to form a closed system and adapted to operate continuously in an automatic cycle when heat is applied to the generator or a heating coil or the like associated therewith. In accordance with the disclosure of said pending applications and of the present application, the successive cycles of operation are brought about automatically by changes in pressure in the refrigerating medium, which in its initial condition when in the generator may be a water solution of ammonia, the pressure variations occurring naturally at different stages in the operation without requiring the use of any other pressure medium.

The apparatus includes means for periodically equalizing automatically the pressure between the absorber and the generator, or auxiliary receptacles associated respectively with said absorber and generator, and means functioning when said pressures are equalized to cause return to the generator of absorptive solution which has previously been conducted to the absorber as weak solution and has absorbed therein refrigerant vapor until it has become strong solution.

One of the objects of the invention is to provide in combination with means for causing return of the strong solution to the generator side of the apparatus as aforesaid, means associated with the generator for receiving the returning solution and accumulating the same until a predetermined quantity has been returned and thereafter discharging such solution into the main generator tank, the volume of the solution so accumulated determining the frequency of the cycles of operation and the amount of strong solution to be returned on each cycle.

Another object of the invention is to provide in the upper part of the generator tank a cup or other small receptacle for receiving the liquid as it is returned to said generator tank and for providing a port-hole from which a conduit leads to the absorber side of the system to transmit thereto vapor and liquid, alternately, for controlling the cycle of operation of the apparatus in manner which will hereinafter appear.

A still further object of the invention is to provide a generator construction and an arrangement of heating means therefor whereby an exceptionally high concentration may be maintained in the part of the solution adapted to be heated to generate refrigerant vapor and an exceptionally low concentration may be maintained in the part of the solution from which weak solution is adapted to be conducted to the absorber as required for absorbing the refrigerant vapor passing thereinto from the evaporator.

The apparatus with which the invention is concerned also includes means whereby absorption may take place continuously in the absorber without being interrupted by the periodic return of the strong solution from the absorber side of the system to the generator side.

Other objects and advantages of the invention will be apparent from the description and the accompanying drawings illustrating a preferred embodiment thereof.

Referring to the drawings:

Fig. 2 is a detail sectional view on an enlarged scale of the balancing valve for controlling the return of strong solution from the absorber side of the system to the generator side; and Fig. 3 is a detail view of the regulating valve for controlling the admission of weak solution to the absorber.

Figure 1:
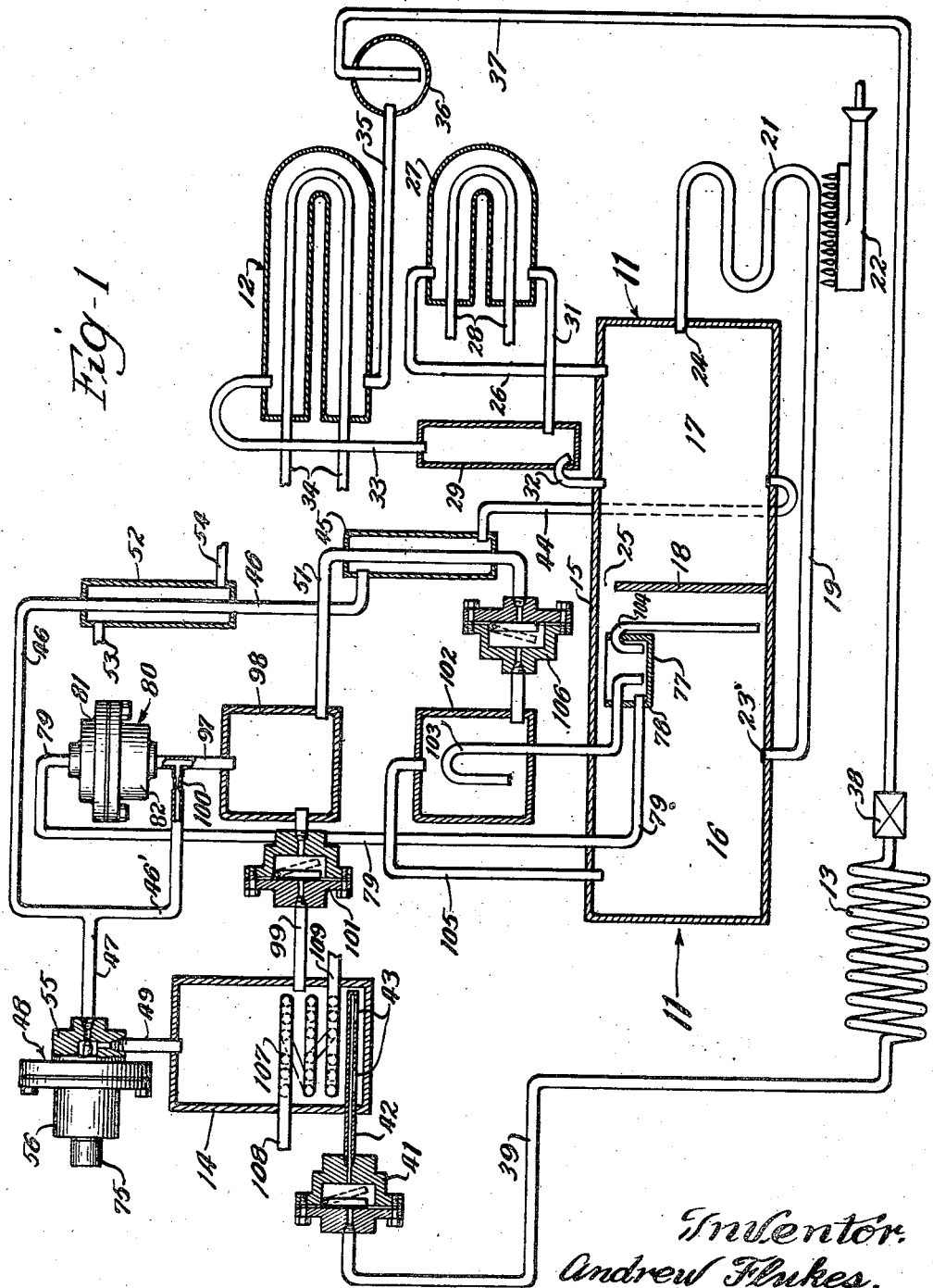
Fig. 1 is a general view, partly diagrammatic and with certain parts shown in section, illustrating the refrigerating system of the invention.

As previously indicated, the primary elements of the system are a generator, a condenser, an evaporator and an absorber with interconnecting conduits and with controls and auxiliary devices arranged to cause continuous operation of the system when heat is applied to the generator. The generator is indicated generally by the reference numeral 11, the condenser by the numeral 12, the evaporator by the numeral 13 and the absorber by the numeral 14. The generator as shown includes a tank 15 which is divided into two compartments 16 and 17 by means of a partition 18, the compartment 16 being connected by means of a conduit 19 with a coil 21 beneath which is located a gas burner or other source of heat 22. As shown, the conduit 19 takes off from the tank 15 at a point 23 at the bottom of the tank in the compartment 16 and the coil 21 leads into the compartment 17 of the tank at a point indicated by the reference numeral 24. The partition 18 extends upwardly from the bottom of the tank 15 to a point below the top thereof, leaving a passage 25 between the compartments 16 and 17 which are adapted to contain, respectively, strong and weak refrigerant solution, the separation promoting the efficiency of the apparatus, as will be understood from the description of the operation hereinafter contained.

The tank 15 is charged with absorption liquid, such as water having a predetermined quantity of liquid refrigerant, such as ammonia, dissolved therein. Liquid from the compartment 16 will pass through the conduit 19 and coil 21 and when heat is applied to the latter by means of the burner 22 vapors and hot solution pass into the compartment 17 at the intake point 24. From this compartment the vapor rises through a conduit 26 which leads into a rectifier 27 where the temperature is somewhat reduced by suitable cooling medium, such, for example, as water passing through a pipe 28 connected with suitable inlet and outlet conduits (not shown in the drawings).

The reduction of the temperature in the rectifier condenses the water vapor into liquid which, with the ammonia vapor, is conducted from the rectifier to a trap 29 by means of a pipe 31. The water is returned to the generator by way of a siphon tube or other suitable connection 32 and the ammonia vapor, which is now substantially anhydrous, passes from the trap 29 through a pipe 33 into the condenser 12. The latter is cooled by means of a cooling medium such as cold water passing through a pipe 34 which, as shown, is broken away as in the case of the pipe 28 in the rectifier 27 and is adapted to connect with a suitable source of cold water and a discharge pipe in obvious manner. The further reduction of temperature of the ammonia vapor which takes place in the condenser 12 causes it to condense into a liquid which is conducted by means of a pipe 35 to a receiving tank 36 which provides for accumulation of the liquid ammonia to be used as required by the refrigerating elements of the system. Said receiver is connected by means of a conduit 37 with the evaporator 13 through a conventional expansion valve 38 which serves to control the passage of the refrigerant to the evaporator and to reduce the pressure thereof to correspond to the pressure desired in the evaporator. As the ammonia enters the evaporator under reduced pressure it evaporates into a vapor, lowering the temperature in the evaporator to the desired degree to cause the evaporator to perform its refrigerating function. From the evaporator the vapor passes through a conduit 39, a conventional check valve 41 and an intake pipe 42 into the lower part of the absorber 14, said pipe 42 having discharge openings 43 therein which preferably open downwardly so that the vapor is ejected into the absorber at the bottom thereof.

It will be understood that the vapor entering the absorber is absorbed by weak solution therein which is transferred from the generator as required. Such weak solution is conducted from the compartment 17 of the generator tank 15 by means of a conduit 44, a heat exchanger 45, a conduit 46, a conduit 47, a regulating valve 48 and an intake pipe 49 extending from said regulating valve through the top of the absorber. The absorption of vapor by the weak solution in the absorber increases the concentration of the solution, thereby decreasing its capacity to absorb the incoming vapor. This has a tendency to raise the pressure in the absorber. However, it is desired to maintain the absorber pressure relatively low so that it will as nearly as possible correspond to the temperature in the evaporator and accordingly weak solution is admitted through the valve 48 as required to maintain the proper pressure condition in the absorber and to provide for the absorption of vapor therein as it enters from the evaporator.

Referring more particularly to the means whereby the weak solution is transferred from the generator to the absorber, it will be observed that the pipe 44 takes off from the bottom of the weak liquor compartment of the generator tank where the weakest solution is located. The heat exchanger 45 serves to partially cool said liquor, which is hot when it leaves the generator and should be cool when it reaches the absorber, the heat exchange being between such hot weak solution and the cool strong solution passing from the absorber side of the apparatus to the generator side through a conduit 51 to be again referred to at a later point herein. Inasmuch as it is desired that the strong solution when it returns to the generator shall be warm, this heat exchanger serves to condition both the strong and weak solution in accordance with the requirements of the system.

The weak solution is further cooled by means of a cooling jacket 52 surrounding the pipe 46, said cooling jacket having inlet and outlet pipes 53 and 54 connecting with a source of cold water and a discharge point, respectively.

The regulating valve 48 is shown in detail in Fig. 3. The valve comprises housing portions 55 and 56 connected together by means of screws 57. A diaphragm 58 is clamped between the edges of said housing members 55 and 56 by means of said screws and the central portion thereof is disposed between disks 59 and 61, the former being integral with a valve sleeve 62 and the latter being under the pressure of a coil spring 63 mounted in the housing portion 56, one end of said spring being disposed over a stud 64 of said disk 61 and the other end being arranged upon a stud 65 projecting inwardly from an adjustment disk 66. A relatively small spring 67 is mounted on the valve sleeve 62 to oppose the action of the spring 63, but the relative tension of said springs is such that the diaphragm is normally urged sufficiently to the right (viewing Fig. 3) to keep a needle valve 68, positioned within the valve sleeve 62, in contact with a valve seat 69, through which there is a passage 71 communicating with the conduit 47 through which the weak solution comes from the generator. The conduit 49 extends into a shoulder portion 72 of the housing member 55 which has a passage 73 therein in communication with a vertical passage 76 between the end of said conduit 49 and the valve chamber. The spring 63 is placed under predetermined compression by means of an adjusting screw 74 acting upon the disk 66, a cap 75 being threaded upon a projecting end portion of the housing 56 to enclose said adjusting screw.

When the pressure in the absorber reaches a predetermined point it is exerted through the conduit 49 and passage 73 against the diaphragm 58, causing the latter to move to the left (viewing Fig. 3), thus compressing the spring 63 and causing the valve 68 to be unseated, thereby permitting weak solution to pass from the conduit 47 through the passage 71 in the valve seat member 69 and through the passage 76 into the conduit 49, by which it is conducted into the absorber. After enough weak solution has entered the absorber to reduce the pressure therein to the point that the compression of the spring 65 overcomes the opposed pressure upon the diaphragm, the valve 68 closes and remains closed until weak solution is again demanded by the absorber.

As the quantity of solution in the absorber is increased that in the generator is decreased, and means must be provided for returning the strong solution to the generator. It is in the instrumentalities employed for this purpose that the present invention principally resides.

In the embodiment of the invention shown, a cup or other relatively small receptacle 77 is positioned in the upper part of the generator tank 15, being supported by any suitable means (not shown), and said cup has a port-hole 78 therein from which a conduit 79 extends laterally for a distance and thence upwardly through the top of the generator tank. The upper part of said conduit leads into a valve 80, which is termed a "balancing" or "equalizing" valve for reasons which will later appear. When the pressures on opposite sides of said valve are substantially equal the valve will be open and is adapted to close under conditions of unbalanced pressure, as will be hereinafter explained. The construction of this valve is shown in Fig. 2 of the drawings to which attention is now directed.

The valve housing comprises two sections 81 and 82 secured together by screws 83 extending through mating circumferential flanges thereof. The pipe 79 is threaded into the top of the housing section 81 and communicates with a chamber 84 therein in which there is positioned a valve member 85 mounted upon a stud 86 extending through a disk 87 slidably mounted within a flanged ring 88 in the housing section 82, said ring 88 serving as a valve seat adapted to cooperate with the valve member 85 to close the valve under certain conditions hereinafter described. Said stud 86 has an enlarged portion 89 separating the disks 85 and 87 and has a coil spring 91 arranged thereon between said disk 87 and a spider 92 positioned near the bottom of a chamber 93 in the lower housing section 82, said spider serving as a guide for the lower end of said stud. The valve member 85 is guided by means of pins 94 depending from the interior of the housing section 81 and fitting within sockets in the top of said valve member. The disk 87 has holes 95 through which vapor and, at times, liquid may pass when the valve is open, and the spider 92 has openings 96 therein providing communication from the chamber 93 to a conduit 97 extending downwardly from the bottom of the housing section 82.

A branch 46' from the conduit 46 leads into the pipe 97 through a restricted throat or orifice 100, which serves as an expansion port. Said conduit 97 leads into the top of a tank 98, hereinafter referred to as a "differential pressure tank," which is connected with the absorber 14 by means of a conduit 99 in which there is a check valve 101 permitting flow through said conduit in one direction only, namely, from the absorber to said tank 98.

The tank 98 is communicably connected by means of the conduit 51, previously mentioned, with a siphon tank 102 in which there is a siphon tube 103 extending out of the bottom of said tank and through the top of the generator tank 15 into the cup 77 in the latter tank. A siphon tube 104 is provided in said cup for draining the contents thereof into the compartment 16 of the generator tank under certain conditions and a conduit 105 provides an open line of communication between the top of the generator tank 15 and the top of said siphon tank 102.

A check valve 106 is provided in the conduit 51 between the tanks 98 and 102 to prevent back flow therein.

Provision is made for cooling the interior of the absorber 14 by means of a cooling coil 107 having inlet and outlet conduits 108 and 109 connecting, respectively, with a source of cooling medium, such as cold water, and a discharge point. This coil reduces the heat of absorption.

The course of the ammonia vapor through the rectifier, condenser and evaporator to the absorber and the course of the weak solution to the absorber, where it absorbs the vapor and thus becomes strong solution ready to be returned to the generator, have been described. The operation of the devices for effecting such return of the strong solution will now be stated.

At the start of the operation of the system the generator tank 15 is charged with a strong solution of aqua ammonia to a level above the port-hole 78 in the cup 77. When the pressure is increased in the generator tank by application of heat to the coil 21, solution is forced through the conduit 79, the valve 80 (which at this time is in its normally open position) and through the conduit 97 into the tank 98 where, by reason of greater pressure in the generator tank 15 and its associated siphon tank 102, it is held until the liquid level in the generator falls below the port 78. Vapor then passes through the conduit 79 and valve 80. The solution in the differential pressure tank 98 will thereupon pass into the siphon tank 102. When the liquid level therein rises above the bend in the siphon tube 103 the contents of said siphon tank are transferred to the generator tank 15, being discharged into the cup 77. This causes solution to pass through the conduit 79 and valve 80 into the tank 98. The introduction of the solution into said tank causes a reduction in pressure therein sufficient to close the valve 80. Communication with the generator being now shut off, weak solution is caused to flow into the tank 98 from the conduit 46 through the branch 46' and the expansion port 100. The weak solution reduces the pressure in said tank to a point equal to or lower than that in the absorber, causing the accumulated strong solution in the latter to flow into the tank 98 through the conduit 99 and check valve 101. This strong solution soon fills said tank 98 and solution entering the conduit 97 from the conduits 46 and 46' through the expansion port 100 quickly fills the chamber 93 in the lower part of the valve 80 and causes equalization of the pressures on opposite sides of the valve. This causes the valve to open permitting vapor to pass from the generator tank into the differential pressure tank 98, with the result that the solution will flow therefrom into the siphon tank 102, being replaced by the vapor.

When the solution in said tank rises above the top of the tube 103 it will be conducted into the cup 77 in the generator tank. As said cup fills solution is caused to flow through the conduit 79 and valve 80 into the tank 98, thus again reducing the pressure in the latter and causing the valve 80 to close. This results in weak solution again entering the tank 98 reducing the pressure therein to the point that strong solution is drawn from the absorber as previously described, causing the valve 80 to open to admit vapor from the generator and to cause return of said solution to the siphon tank 102, whence it passes to the generator tank 15 when said siphon tank is filled. This cycle is automatically repeated periodically so long as the system is in operation.

Referring again to Fig. 2, it will be seen that the valve 80, in the embodiment shown in the drawings, is closed by the reduction of the pressure in the valve chamber 93 in the manner hereinbefore described, and by the friction of liquid rushing through the small openings 95 in the disk 87. The opening of the valve, as formerly stated, is caused by the spring 91 when the pressures on opposite sides of the valve are substantially equal.

It will be understood that in certain applications of the apparatus the conduit 79 and valve 80 could communicate directly with the absorber and that also, if desired, the strong solution could be returned directly to the main generator tank, in which latter case the port 78 would preferably be located in a wall of said generator tank or in a tube therein open at both ends so as to be covered and uncovered by the rise and fall of the main body of liquid in the generator tank.

However, by providing the differential pressure tank 98, in which equalization of pressure in relation to the generator pressure may take place periodically to provide for return of strong solution to the generator, it is unnecessary to effect such periodic equalizations in the absorber itself, which may therefore perform its intended function of absorption continuously. The tank 98, while it may be regarded, in a sense, as a part of the absorber tank since there is constant communication from the main absorber tank 14 to it, is enabled to perform the function of returning the strong solution to the generator without disturbing the absorptive action in said main absorber tank by reason of the fact that the check valve 101 permits communication between said tanks in only one direction.

Furthermore, the use of the siphon tank 102, which may be suitably related in size to the differential pressure tank 98, provides for the transfer of a predetermined quantity of solution from the latter to the former of said tanks and for the closing of the balancing valve 80 when the liquid in the tank 102, which is in communication with and thus in a sense forms a part of the generator tank 15, rises to a certain level, this being a convenient means of providing for return or "dumping" of strong solution at frequent intervals and in relatively small amounts in applications of the apparatus where such an arrangement is indicated as being desirable. When this construction is employed the cup 77 in the generator tank may conveniently be used and provides means for quickly closing the balancing valve 80 by directing liquid through the conduit 79 and said valve into the tank 98 to reduce the pressure therein when the transfer of solution from said tank to the tank 102 has been completed and such solution begins to flow from said tank to the main generator tank 15 through the siphon tube 103.

The foregoing detailed description has been given for clearness of understanding only, and no unnecessary limitations should be understood therefrom, but the appended claims should be construed as broadly as permissible in view of the prior art.

I claim:

1. In absorption type refrigeration apparatus, the combination with a generator, a condenser, an evaporator, an absorber and means for conducting a refrigerating medium from the generator through the condenser and evaporator to the absorber, of means for conducting absorptive solution weak in refrigerant from the generator to the absorber to absorb refrigerant vapor therein, means for returning strong solution from a point of normally low pressure associated with the absorber to a point of normally high pressure associated with the generator, and means for controlling such return of the strong solution, said last-mentioned means comprising means for periodically balancing the pressures on the absorber side and the generator side of the apparatus, means for conducting vapor from the generator side to the absorber side to replace the strong solution which is caused to flow back to the generator side of the apparatus when said pressures are balanced, and means whereby the strong solution after being returned to the generator side of the apparatus causes termination of the return flow of such solution when a predetermined quantity thereof has been returned.

2. In absorption type refrigeration apparatus, the combination with a generator, a condenser, an evaporator, an absorber and means for conducting a refrigerating medium from the generator through the condenser and evaporator to the absorber, of means for conducting absorptive solution weak in refrigerant from the generator to the absorber to absorb refrigerant vapor therein, means for returning strong solution from a point of normally low pressure associated with the absorber to a point of normally high pressure associated with the generator, and means for controlling such return of the strong solution, said last-mentioned means comprising means for periodically balancing the pressures on the absorber side and the generator side of the apparatus, means for conducting vapor from the generator side to the absorber side to replace the strong solution which is caused to flow back to the generator side of the apparatus when said pressures are balanced, and means whereby the strong solution after being returned to the generator side of the apparatus causes termination of the return flow of such solution when a predetermined quantity thereof has been returned, said conducting means including a pressure-controlled valve adapted to open when said pressures are balanced and to be closed when they are unbalanced.

3. In absorption type refrigeration apparatus, the combination with a generator, a condenser, an evaporator, an absorber and means for conducting a refrigerating medium from the generator through the condenser and evaporator to the absorber, of means for conducting absorptive solution weak in refrigerant from the generator to the absorber to absorb refrigerant vapor therein, means for returning strong solution from a point of normally low pressure associated with the absorber to a point of normally high pressure associated with the generator, and means for controlling such return of the strong solution, said last-mentioned means comprising means for periodically balancing the pressures on the absorber side and the generator side of the apparatus and means for conducting vapor from the generator side to the absorber side to replace the strong solution which is caused to flow back to the generator side of the apparatus when said pressures are balanced, said conducting means including a pressure-controlled valve adapted to open when said pressures are balanced and to be closed when they are unbalanced, said conducting means being arranged to convey liquid from the generator side of the apparatus to the absorber side at certain stages in the cycle of operations to reduce the pressure on absorber side of the valve and thus cause the same to close.

4. In absorption type refrigeration apparatus, the combination with a generator, a condenser, an evaporator, an absorber and means for conducting a refrigerating medium from the generator through the condenser and evaporator to the absorber, of means for conducting absorptive solution weak in refrigerant from the generator to the absorber to absorb refrigerant vapor therein means for returning strong solution from a point of normally low pressure associated with the absorber to a point of normally high pressure associated with the generator, and means for controlling such return of the strong solution, said last-mentioned means comprising means for periodically balancing the pressures on the absorber side and the generator side of the apparatus and means for conducting vapor from the generator side to the absorber side to replace the strong solution which is caused to flow back to the generator side of the apparatus when said pressures are balanced, said conducting means including a pressure-controlled valve adapted to open when said pressures are balanced and to be closed when they are unbalanced, said conducting means being arranged to convey liquid from the generator side of the apparatus to the absorber side at certain stages in the cycle of operations to reduce the pressure on absorber side of the valve and thus cause the same to close, said valve having restricted openings therein through which such liquid must pass whereby the friction so created assists in closing the valve.

5. In absorption type refrigeration apparatus, the combination with a generator, a condenser, an evaporator, an absorber and means for conducting a refrigerating medium from the generator through the condenser and evaporator to the absorber, of means for conducting absorptive solution weak in refrigerant from the generator to the absorber to absorb refrigerant vapor therein, a differential pressure tank having one-way communication with the absorber and being adapted to receive strong solution therefrom at certain stages in the cycle of operations of the apparatus, means for transferring said strong solution from said differential pressure tank to a point of normally high pressure associated with the generator, and means for controlling such transfer of strong solution, said last-mentioned means comprising means for periodically balancing the pressures between said differential pressure tank and the generator, means for conducting vapor from the generator to said differential pressure tank to replace the strong solution caused to return to the generator side of the apparatus when said pressures are balanced, and means whereby the strong solution after being returned to the generator side of the apparatus causes termination of the return flow of such solution when a predetermined quantity thereof has been returned.

6. In absorption type refrigeration apparatus, the combination with a generator, a condenser, an evaporator, an absorber and means for conducting a refrigerating medium from the generator through the condenser and evaporator to the absorber, of means for conducting absorptive solution weak in refrigerant from the generator to the absorber to absorb refrigerant vapor therein, an auxiliary tank associated with the generator, means for transferring to said tank periodically strong solution withdrawn from the absorber, means for evacuating said auxiliary tank of a charge of said strong solution automatically when, and by reason of the fact that, said discharge reaches a predetermined volume and for discharging the same into the main generator tank, and means for controlling the transfer of strong solution to said auxiliary tank, said last-mentioned means comprising means for periodically balancing the pressures on the absorber side and the generator side of the apparatus and means for conducting vapor from the generator side to the absorber side to replace the strong solution caused to be transferred to said auxiliary generator tank when said pressures are balanced.

7. In absorption type refrigeration apparatus, the combination with a generator, a condenser, an evaporator, an absorber and means for conducting a refrigerating medium from the generator through the condenser and evaporator to the absorber, of means for conducting absorptive solution weak in refrigerant from the generator to the absorber to absorb refrigerant vapor therein, a differential pressure tank having one-way communication with the absorber and being adapted to receive strong solution therefrom at certain stages in the cycle of operations of the apparatus, an auxiliary tank associated with the generator, means for periodically transferring to said auxiliary tank strong solution from said differential pressure tank, means for evacuating said auxiliary tank of a charge of said strong solution automatically when, and by reason of the fact that, said discharge reaches a predetermined volume and for discharging the same into the main generator tank, and means for controlling the transfer of strong solution from said differential pressure tank to said auxiliary generator tank, said last-mentioned means comprising means for periodically balancing the pressures between said differential pressure tank and the generator and means for conducting vapor from the generator to said differential pressure tank to replace the strong solution caused to be transferred to said auxiliary generator tank when said pressures are balanced.

8. In absorption type refrigeration apparatus, the combination with a generator, a condenser, an evaporator, an absorber and means for conducting a refrigerating medium from the generator through the condenser and evaporator to the absorber, of means for conducting absorptive solution weak in refrigerant from the generator to the absorber to absorb refrigerant vapor therein, means for returning strong solution from a point of normally low pressure associated with the absorber to a point of normally high pressure associated with the generator, and means for controlling such return of the strong solution, said last-mentioned means comprising means for periodically balancing the pressures on the absorber side and the generator side of the apparatus, means for conducting vapor from the generator side to the absorber side to replace the strong solution which is caused to flow back to the generator side of the apparatus when said pressures are balanced, said conducting means including a pressure-controlled valve adapted to open when said pressures are balanced and to be closed when they are unbalanced, and means associated with the generator whereby when a predetermined volume of strong solution has been returned to the generator side of the apparatus a quantity of solution is directed through said valve to reduce the pressure on the absorber side thereof and thereby cause the valve to close to prevent further transfer of strong solution until said pressures are again balanced.

9. In absorption type refrigeration apparatus, the combination with a generator, a condenser, an evaporator, an absorber and means for conducting a refrigerating medium from the generator through the condenser and evaporator to the absorber, of means for conducting absorptive solution weak in refrigerant from the generator to the absorber to absorb refrigerant vapor therein, an auxiliary tank associated with the generator, means for transferring to said tank periodically strong solution withdrawn from the absorber, means for discharging into the main generator tank the solution accumulated in said auxiliary tank when the same has reached a predetermined volume, and means for controlling the transfer of strong solution to said auxiliary tank, said last-mentioned means comprising means for periodically balancing the pressures on the absorber side and the generator side of the apparatus, means for conducting vapor from the generator side to the absorber side to replace the strong solution caused to be transferred to said auxiliary generator tank when said pressures are balanced, a pressure-controlled valve in said vapor conduit adapted to open when said pressures are balanced, and means whereby when said predetermined volume of solution has been transferred to said auxiliary generator tank a quantity of solution is directed through said valve to reduce the pressure on the absorber side thereof and thereby cause the valve to close to prevent further transfer of solution to said auxiliary generator tank until said pressures are again balanced.

10. In absorption type refrigeration apparatus, the combination with a generator, a condenser, an evaporator, an absorber and means for conducting a refrigerating medium from the generator through the condenser and evaporator to the absorber, of means for conducting absorptive solution weak in refrigerant from the generator to the absorber to absorb refrigerant vapor therein, and means for causing return of strong solution from a point of normally low pressure associated with the absorber to a point of normally high pressure associated with the generator by periodically balancing the pressures between said points, said generator comprising a tank having a partition extending from the bottom part way to the top thereof to provide compartments adapted in the course of operation of the apparatus to contain strong and weak solution, respectively, and means for applying heat only to said strong solution to generate refrigerant vapor therefrom, said means for conducting weak solution to the absorber leading from said weak solution compartment.

11. In absorption type refrigeration apparatus, the combination with a generator, a condenser, an evaporator, an absorber and means for conducting a refrigerating medium from the generator through the condenser and evaporator to the absorber, of means for conducting absorptive solution weak in refrigerant from the generator to the absorber to absorb refrigerant vapor therein, and means for causing return of strong solution from a point of normally low pressure associated with the absorber to a point of normally high pressure associated with the generator by periodically balancing the pressures between said points, said generator comprising a tank having a partition extending from the bottom part way to the top thereof to provide compartments adapted in the course of operation of the apparatus to contain strong and weak solution, respectively, and means whereby solution from said strong solution compartment only may be heated outside the generator tank to generate refrigerant vapor therefrom, said means for conducting weak solution to the absorber leading from said weak solution compartment.

12. In absorption type refrigeration apparatus, the combination with a generator, a condenser, an evaporator, an absorber and means for conducting a refrigerating medium from the generator through the condenser and evaporator to the absorber, of means for conducting absorptive solution weak in refrigerant from the generator to the absorber to absorb refrigerant vapor therein, an auxiliary tank associated with the generator, means for transferring to said tank periodically strong solution withdrawn from the absorber, means including a siphon for discharging into the main generator tank the solution accumulated in said auxiliary tank when the same has reached a predetermined volume, and means for controlling the transfer of strong solution to said auxiliary tank, said last-mentioned means comprising means for periodically balancing the pressures on the absorber side and the generator side of the apparatus, and means for conducting vapor from the generator side to the absorber side to replace the strong solution caused to be transferred to said auxiliary generator tank when said pressures are balanced.

ANDREW FLUKES.